US010747794B2

(12) United States Patent
Raj M et al.

(10) Patent No.: US 10,747,794 B2
(45) Date of Patent: Aug. 18, 2020

(54) SMART SEARCH FOR ANNOTATIONS AND INKING

(71) Applicant: Microsoft Technology Licensing, LLC, Redmond, WA (US)

(72) Inventors: Nithin Raj M, Hyderabad (IN); Neha Motghare, Hyderabad (IN); Rahul Razdan, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 252 days.

(21) Appl. No.: 15/864,587

(22) Filed: Jan. 8, 2018

(65) Prior Publication Data

US 2019/0213276 A1    Jul. 11, 2019

(51) Int. Cl.
| | | |
|---|---|---|
| *G06F 16/33* | (2019.01) | |
| *G06F 16/907* | (2019.01) | |
| *G06F 16/35* | (2019.01) | |
| *G06F 16/93* | (2019.01) | |
| *G06F 16/338* | (2019.01) | |

(52) U.S. Cl.
CPC .......... *G06F 16/334* (2019.01); *G06F 16/338* (2019.01); *G06F 16/353* (2019.01); *G06F 16/907* (2019.01); *G06F 16/93* (2019.01)

(58) Field of Classification Search
CPC .... G06F 17/241; G06F 16/338; G06F 16/951; G06F 16/9535; G06F 16/8365; G06F 16/9558; G06F 16/739; G06F 16/90332; G06F 17/242; G06F 3/0482; G06F 16/24573; G06F 17/276; G06F 16/22; G06F 16/245; G06F 16/93; G06F 16/285; G06F 16/35

USPC .......................................... 707/600–831, 899
See application file for complete search history.

(56) References Cited

U.S. PATENT DOCUMENTS

| | | | | |
|---|---|---|---|---|
| 8,005,850 | B2* | 8/2011 | Walther | G06F 16/9558 707/758 |
| 8,131,756 | B2* | 3/2012 | Carus | G06N 20/00 707/776 |
| 9,251,130 | B1 | 2/2016 | Lynnes et al. | |
| 2005/0060643 | A1* | 3/2005 | Glass | G06F 17/241 715/205 |
| 2005/0234891 | A1* | 10/2005 | Walther | G06F 16/9558 |
| 2006/0218171 | A1* | 9/2006 | Wakeam | G06K 9/00409 |
| 2007/0055926 | A1 | 3/2007 | Christiansen et al. | |
| 2010/0241947 | A1 | 9/2010 | Dahn et al. | |
| 2010/0306249 | A1* | 12/2010 | Hill | G06Q 30/02 707/769 |

(Continued)

OTHER PUBLICATIONS

"International Search Report and Written Opinion Issued in PCT Application No. PCT/US18/066101", dated Mar. 19, 2019, 12 Pages.

*Primary Examiner* — Angelica Ruiz
(74) *Attorney, Agent, or Firm* — Arent Fox LLP

(57) ABSTRACT

Methods and devices for searching annotations in a document may include receiving a search request with at least one requested annotation classification to search for in a document. The methods and devices may include performing a search of the document for one or more annotations in the document matching the at least one annotation classification. The methods and devices may include generating a search result list with the one or more annotations in the document matching the at least one annotation classification. The methods and devices may include presenting the search result list.

17 Claims, 5 Drawing Sheets

(56) References Cited

U.S. PATENT DOCUMENTS

2013/0031457 A1* 1/2013 Griffiths ................ G06F 17/241
                                                          715/231
2015/0186351 A1   7/2015 Hicks et al.
2016/0225059 A1*  8/2016 Chow .................... G06F 16/22

* cited by examiner

| Annotation 16 | Location Info 18 | Classification Info 20 | |
|---|---|---|---|
| ☆ | Location 1 | Star Shape | 202 |
| ? | Location 2 | Question Mark | 204 |
| Read Later | Location 3 | Text with words "Read Later" | 206 |
| ▭ | Location 4 | Yellow Highlight | 208 |
| ▭ | Location 5 | Green Highlight | 210 |
| ⋮ | ⋮ | ⋮ | |

FIG. 2

SMART SEARCH FOR ANNOTATIONS AND INKING

BACKGROUND

The present disclosure relates to apparatus and methods for searching documents and/or webpages.

Users may annotate documents and/or webpages in different ways. Currently, for a user to revisit annotated content where the user highlighted and/or inked the document, the user manually navigates to every section of the document to determine whether any additional annotations may have been added in a particular section. Moreover, the search capabilities available for any document or a webpage is limited to text and images. As such, users are typically limited to search capabilities based on plain text and/or image searching without any intelligence around the searches.

Thus, there is a need in the art for improvements in searching capabilities of documents and/or webpages.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include memory configured to store data and instructions, at least one processor configured to communicate with the memory, an operating system configured to communicate with the memory and the processor, wherein the operating system is operable to: receive a search request with at least one requested annotation classification to search for in a document; perform a search of the document for one or more annotations in the document matching the at least one annotation classification; generate a search result list with the one or more annotations in the document matching the at least one annotation classification; and present the search result list.

Another example implementation relates to a method for searching annotations in a document for use with hardware of a computer device. The method may include receiving, at an operating system executing on the computer device, a search request with at least one requested annotation classification to search for in a document. The method may include performing a search of the document for one or more annotations in the document matching the at least one annotation classification. The method may include generating a search result list with the one or more annotations in the document matching the at least one annotation classification. The method may include presenting the search result list.

Another example implementation relates to computer-readable medium storing instructions executable by a computer device. The computer-readable medium may include at least one instruction for causing the computer device to receive a search request with at least one requested annotation classification to search for in a document. The computer-readable medium may include at least one instruction for causing the computer device to perform a search of the document for one or more annotations in the document matching the at least one annotation classification. The computer-readable medium may include at least one instruction for causing the computer device to generate a search result list with the one or more annotations in the document matching the at least one annotation classification. The computer-readable medium may include at least one instruction for causing the computer device to present the search result list.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIG. 2 is an example annotation information table for use on a computer device in accordance with an implementation of the present disclosure;

DETAILED DESCRIPTION

This disclosure relates to devices and methods for smart searching of documents and/or webpages. The devices and methods may augment current search experiences to provide capabilities to search annotations within documents and/or webpages based on an annotation type or classification. In one example, a user may select to search all annotations in a document marked with yellow highlights. Another example may include a user selecting to search all ink strokes within a document for a question mark.

Users may annotate documents and/or webpages in different ways for a variety of reasons. Reasons for annotating a document may include, but are not limited to, marking a portion of the document as important, unimportant, read later, and/or did not understand. Currently, for a user to revisit annotated content where the user highlighted and/or inked the document, the user manually navigates to every section of the document to determine whether any additional annotations were added in each particular section. This manual navigation may be cumbersome and/or time consuming. For example, when a student annotates a text book, manually navigating through the pages of the text book to locate the annotations may be difficult and/or time consuming. Moreover, annotations may be missed by the user.

The devices and methods provide augmented search capabilities that may allow a user to search different annotations within a document. Annotations may have at least one of a plurality of different annotation classifications, such as but not limited to, highlighting, ink strokes, notes, coloring (e.g., colored highlights, ink strokes, or notes), and/or markings (e.g., symbols or other indicia) made by the user on the document. As such, when a user annotates a document, the devices and methods may allow a user to easily locate and/or navigate to portions of the document where the user added the annotations. The devices and methods may also provide a curated experience for the searches performed by a user. For example, the devices and methods may provide a summary of all content marked with a star, or all content highlighted with a specific color (e.g., yellow).

Figure 1:
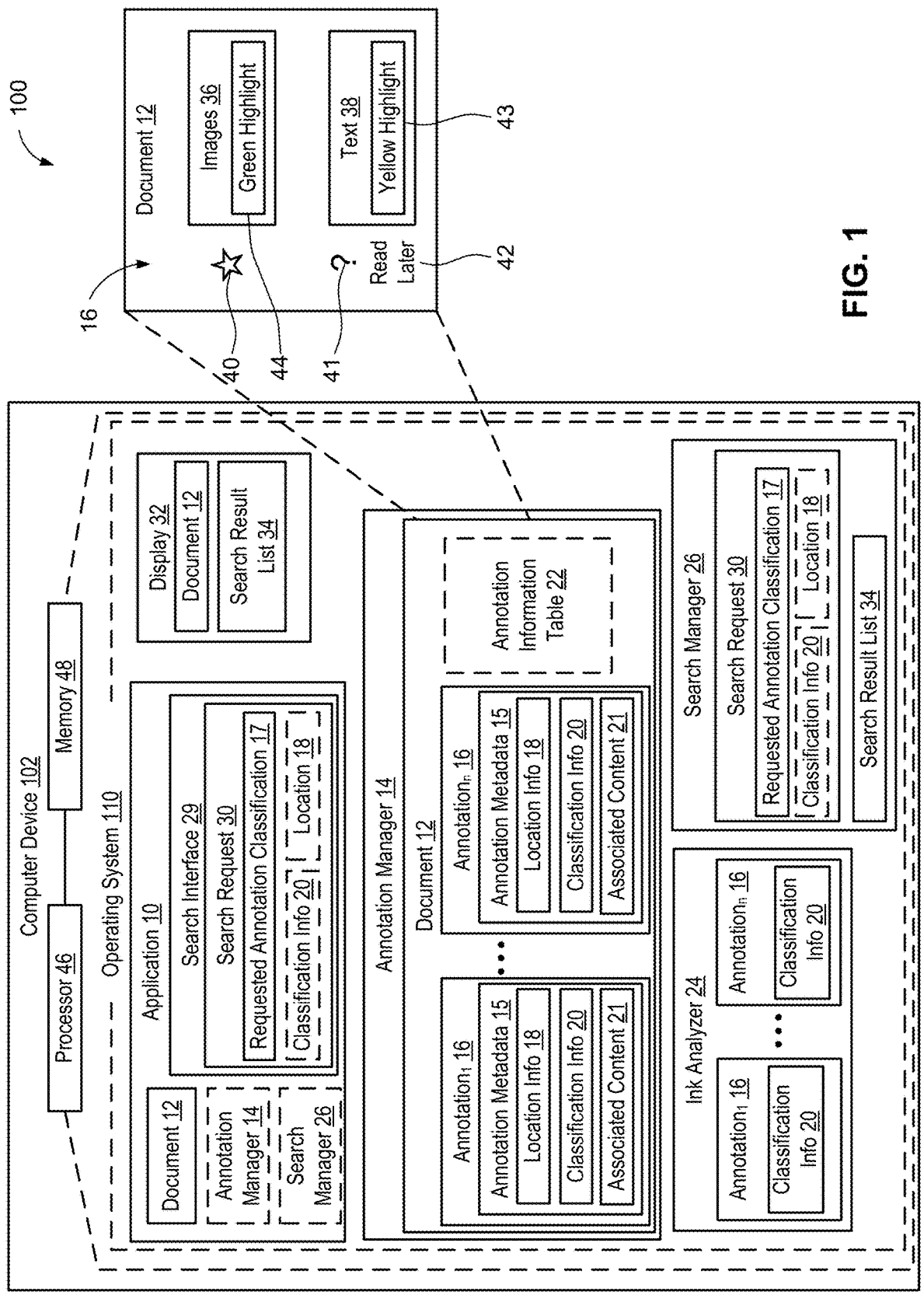
FIG. 1 is a schematic block diagram of an example computer device in accordance with an implementation of the present disclosure.

Referring now to FIG. 1, an example computer device 102 for use with searching annotations may include one or more applications 10 that may have one or more documents 12 presented to a user on a display 32. Documents 12 may include images 36 and/or text 38, among other content presented to a user. Documents 12 may be any electronic or digital document having any type of content, including, but not limited to, images, videos, tables, annotations, such as, highlights, text notes, and/or inking. When viewing document 12, a user may make one or more annotations 16 on the document 12. Annotations 16 may have at least one of a plurality of annotation classifications, such as but not limited to, highlighting, ink strokes, notes, coloring (e.g., colored highlights, ink strokes, or notes), and/or markings (e.g., symbols or other indicia) made by the user on the document 12. For example, in an example document 12 that includes one or more images 36 and text 38, a user may add a star 40 next to images 36 and a question mark 41 next to text 38. A user may also add green highlighting 44 to images 36 and a yellow highlighting 43 to text 38. In addition, a user may add the words "read later" as notes 42 next to text 38. As such, a user may provide a variety of annotations 16 in various locations within a document 12. Computer device 102 may be used by a user to search the one or more annotations 16 added to document 12 based on the type or classification of the annotation.

Computer device 102 may include an operating system 110 executed by processor 46 and/or system memory 48 of computer device 102. System memory 48 may be configured for storing data and/or computer-executable instructions defining and/or associated with operating system 110, and processor 46 may execute operating system 110. An example of system memory 48 can include, but is not limited to, a type of memory usable by a computer, such as random access memory (RAM), read only memory (ROM), tapes, magnetic discs, optical discs, volatile memory, non-volatile memory, and any combination thereof. An example of processor 46 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a server computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 110 may include an annotation manager 14 that may identify one or more annotations 16 in a document 12 and may store annotation metadata 15 for the one or more annotations 16. Annotation metadata 15 may include, for example, location information 18 and/or classification information 20 associated with annotations 16. In addition, annotation metadata 15 may include associated content 21 that identifies content from document 12 associated with the one or more annotations 16. A portion of the content above and/or below the annotation 16 may be included in the associated content 21. Associated content 21 may include, but is not limited to, a portion of text (e.g., a line, a paragraph), images, and/or audio. In an implementation, a predetermined range may be used to determine an amount of content to include in the associated content 21. The predetermined range may include location information in document 12 above and/or below the annotation 16.

For example, annotation manager 14 may identify when additional ink strokes, marks, underlines, highlighting, coloring, and/or notes are added to a document 12. In an implementation, annotation manager 14 may be included in application 10. When an annotation 16 is detected in a document 12 by annotation manager 14, annotation manager 14 may determine location information 18 for the detected annotation 16. For example, each page in document 12 may have X and Y coordinates. Whenever an annotation 16 is made in document 12, the location information 18 may store the X and Y coordinates information and/or the page numbers when relevant to determine a position within document 12 where the annotation 16 was made. For example, when a user marks an electronic book displayed on a webpage with a question mark, annotation manager 14 may identify the HTML section of the electronic book where the question mark occurred and may store the location information 18 as annotation metadata 15 associated with the online book. Another example may include a user highlighting a presentation. Annotation manager 14 may determine the line and/or page number where the user highlighted the presentation and store the line and/or page number as location information 18 of the highlighting.

In addition, annotation manager 14 may analyze the detected annotation 16 and may determine classification information 20 that provides a classification to be associated with the annotation 16. Classification information 20 may include, but is not limited to, one or more of a shape of annotation 16, a color of annotation 16, a type of annotation 16 (e.g., highlighting, a symbol, text, etc.), and/or words added by annotation 16. In an implementation, annotation manager 14 may communicate with an ink analyzer 24 to determine the classification of annotation 16. The ink analyzer 24 may analyze the ink strokes of the detected annotations 16 in order to determine the classification information 20 for the annotation 16. For example, ink analyzer 24 may determine a shape of an ink stroke. In addition, ink analyzer 24 may determine the color of the ink stroke and/or mark. Ink analyzer 24 may also determine words added by the ink stroke and/or notes. For example, if a user added the words "read later" as notes to document 12, ink analyzer 24 may add the words "read later" as the classification information 20 for the notes. Annotation manager 14 may receive the classification information 20 from ink analyzer 24 for each detected annotation 16 and may store the classification information 20 as annotation metadata 15.

Annotation manager 14 may also create an annotation information table 22 with the annotation metadata 15 associated with document 12. For example, annotation information table 22 may store the classification information 20 along with the location information 18 of the annotations 16 identified in document 12. An example annotation information table 22 is illustrated in FIG. 2.

Referring now to FIG. 2, annotation information table 22 may store an association between the classification information 20 and the location information 18 of the identified annotations 16. For example, annotation information table 22 may include in row 202 a star 40 as the annotation 16 along with "Location 1" as the location information 18 and a star shape as the classification information 20. At row 204, annotation information table 22 may include a question mark 41 as the annotation 16 with "Location 2" as the location information 18 and a question mark as the classification information 20. At row 206, annotation information table 22 may include notes 42 as the annotation 16 with "Location 3" as the location information 18 and text with words "read later" as the classification information 20. At row 208, annotation information table 22 may include highlighting 43 as the annotation 16 with "Location 4" as the location information 18 and yellow highlight as the classification information 20. At row 210, annotation information table 22 may include highlighting 44 as the annotation 16 with "Location 5" as the location information 18 and green highlight as the classification information 20.

As new annotations 16 are identified by annotation manager 14, the classification information 20 and the location information 18 of the newly identified annotations 16 may be added to the annotation information table 22. Annotation information table 22 may be stored as part of the annotation metadata 15 associated with document 12. As such, annotation information table 22 may be used by annotation manager 14 to access the one or more annotations 16 identified for the document 12.

Referring back to FIG. 1, for each document 12, annotation manager 14 may store the detected annotations 16 and any associated annotation metadata 15. As such, when a user accesses document 12, the annotations 16 and/or annotation metadata 15 information may be accessed by application 10.

Operating system 110 may also include a search manager 26 that may receive one or more search requests 30 and may generate a search result list 34 based on the searches performed. In an implementation, application 10 may include search manager 26.

The search requests 30 may identify one or more requested annotation classification(s) 17 to search for in document 12. Requested annotation classification(s) 17 may include, but are not limited to, a type of annotation (e.g., highlight, underline, ink stroke), a highlight color, and/or a type of ink stroke (e.g., question mark, circle, star). The search requests 30 may also include other search criteria, such as, but not limited to, location information 18 where the annotation 16 is made in document 12. As such, the search requests 30 may include the requested annotation classification(s) 17 in conjunction with the location information 18 where the annotation is made in document 12. For example, a user may identify a particular class of annotation, e.g., highlighting annotations, based on the requested annotation classification(s) 17 in the search request 30. In addition, a user may identify one or more location ranges to search in the document, e.g., search pages 1 through 10 of a book, for the requested annotation classification(s) 17. As such, the search performed by search manager 26 may be tailored based on the search criteria included in the search requests 30.

In an implementation, application 10 may provide a search interface 29 where one or more search requests 30 may be entered. Search interface 29 may allow a user to add and/or remove one or more requested annotation classification(s) 17 to include in search requests 30. For example, a user may access search interface 29 by, for example, selecting a search button in application 10. Search interface 29 may include a text box where a user may enter one or more requested annotation classification(s) 17 to search for in document 12. In addition, search interface 29 may include one or more icons of annotations 16 that the user may select to search for in document 12. The icons may include, but are not limited to, various shapes, characters, symbols, and/or colors. Search interface 29 may also include a drop down menu with one or more requested annotation classification(s) 17 that a user may select to search for in document 12. For example, the dropdown menu may include colors a user may select as the requested annotation classification(s) 17.

One example use case may include a user providing a search request 30 to search for notes and/or ink strokes with the word "helpful." In addition, the user may also select a star symbol to include in the search request 30 to search for all annotations with a star. As such, the search request 30 may request that search manager 26 search for all annotations 16 in the document that include the word "helpful" and/or include a star symbol. Another example may include the user using a dropdown menu to include all highlights in a yellow color and/or a green color to the search request 30. The search request 30 may request that search manager 26 search for all annotations 16 in document 12 that include yellow and/or green highlighting.

Search manager 26 may perform a search based at least upon the search request 30. In an implementation, search manager 26 may search from the start of document 12 to the end of document 12 for annotations 16 matching the requested annotation classification 17. For example, search manager 26 may search the annotation metadata 15 and/or annotation information table 22 associated with document 12. Search manager 26 may search the annotation metadata 15 associated with document 12 for the requested annotation classification(s) 17. In addition, search manager 26 may search the annotation information table 22 associated with the document 12 for the requested annotation classification(s) 17. In an implementation, search manager 26 may perform the search at a document level and/or at a folder level.

When a match occurs between the requested annotation classification 17 and an annotation 16 and/or annotation metadata 15 associated with annotation 16, search manager 26 may store the annotation 16 in a search result list 34. A match may include, for example, when the requested annotation classification 17 matches the classification information 20 of an annotation 16. For example, if the user selected yellow highlights from a drop down menu as the requested annotation classification 17, a match may occur when the classification information 20 indicates yellow highlight for the annotation 16. As such, the search result list 34 may include all annotations 16 in document 12 matching the requested annotation classification 17 and/or any other search criteria included in the search request 30.

The search result list 34 may include associated content 21 from document 12 associated with the annotations 16. A portion of the content above and/or below the annotations 16 may be included in the search result list so a user may see the content surrounding the annotations 16. The associated content 21 may include, but is not limited to, a line of text, a sentence of text, a portion of text, an image, and/or audio near the annotations 16. In an implementation, a predetermined range may be set to determine an amount of content to include in the search result list 34. For example, annotation manager 14 may use the X and Y location coordinates of document 12 to define the predetermine range of an amount of associated content 21 to include in the annotation metadata 15 associated with the annotations 16.

The search result list 34 may also include the associated annotation metadata 15 for the annotations 16 included in the search result list 34. The associated annotation metadata 15 may be used to navigate to portions of document 12 where the user added annotations 16. For example, a user may select an annotation 16 in the search result list 34 and the location information 18 may be used to move to the location in document 12 where annotation 16 was added to document 12. As such, the search result list 34 may be used to easily locate and/or navigate to portions of document 12 where the user added annotations 16.

In addition, the search result list 34 may also provide a curated experience for the search requests 30 performed by a user. The search result list 34 may provide a summary of the annotations 16 added to document 12. For example, the search result list 34 may provide a summary of all content marked with a star, or all content highlighted with a specific color (e.g., yellow).

As such, computer device 102 may be used to provide capabilities to search annotations 16 within documents 12 based on the type or classification of the annotation. In addition, computer device 102 may be used to easily locate and/or navigate to portions of document 12 where the user added annotations 16.

Figure 3:
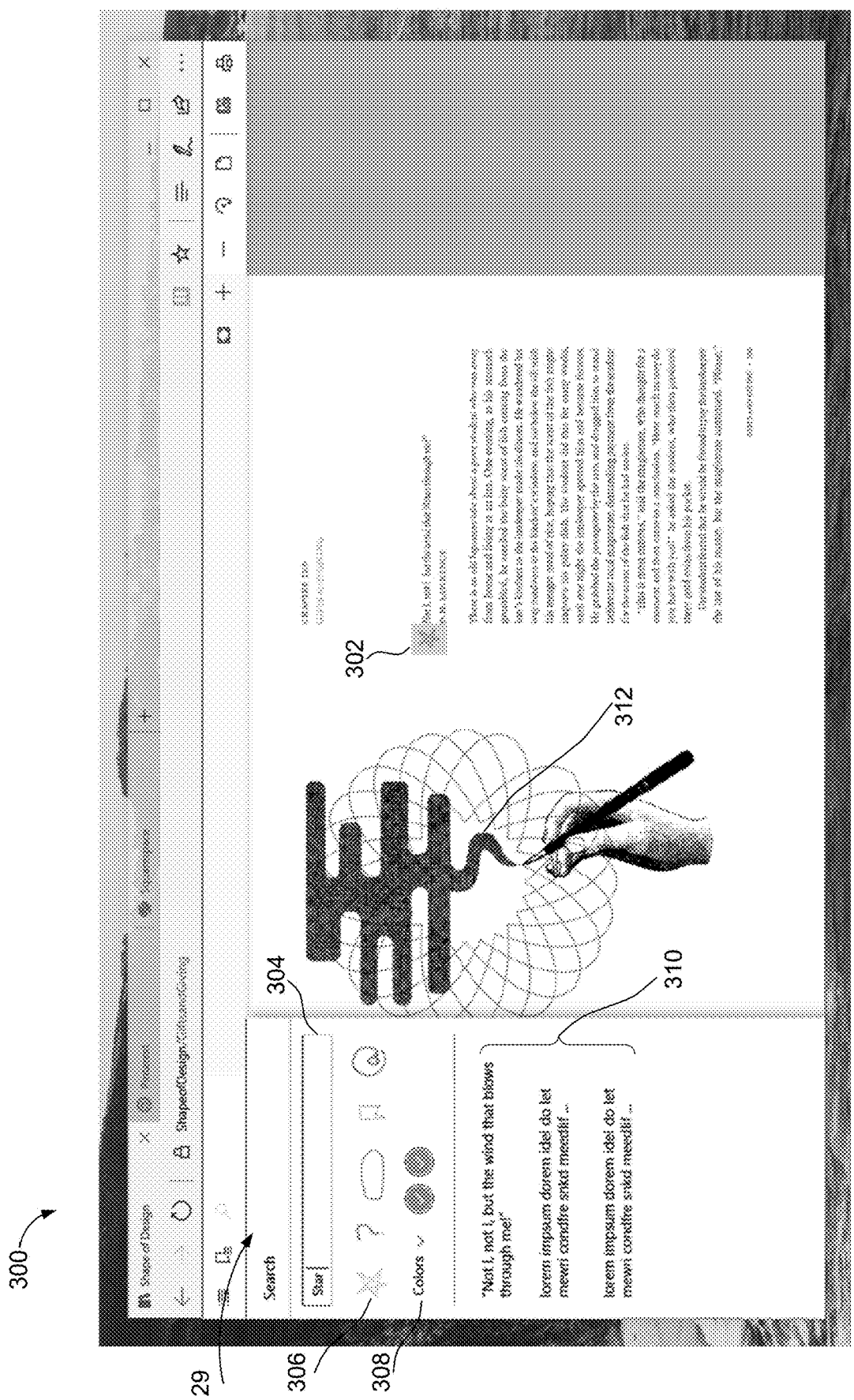
FIG. 3 is an example graphical user interface to use for searching a document on a computer device in accordance with an implementation of the present disclosure.

Referring now to FIG. 3, an example graphical user interface 300 to use for searching document 12 (FIG. 1) may include a search interface 29 and one or more annotations 302 added to document 12 by a user. For example, a user may add one or more annotations to document 12 by drawing additional ink strokes 312 to document 12. Search interface 29 may allow a user to add and/or remove one or more annotations to include in the search request. Search interface 29 may include a text box 304 to enter one or more annotations to include in a search request to search for in document 12. For example, a user may enter "star" in text box 304 to search for star annotations 302 in document 12. Search interface 29 may also include one or more icons 306 representing different annotation classifications that may appear in document 12 a user may select to include in the search request. For example, a user may select a star icon to search for star annotations 302 in document 12.

In addition, search interface 29 may include a dropdown menu 308 that a user may use to select one or more annotations to include in the search request. For example, a user may select various colors (e.g., red and green) of annotations to search for in document 12.

Search interface 29 may also present a search result list 310 with one or more annotations that match the search requests. For example, the search result list 310 may include three different annotations matching the search request. In addition, the search result list 310 may include a brief summary of the annotations included in the search result list 310. A user may select the summary of an annotation and the portion of the document 12 where the selected annotation is located may be displayed.

Thus, search interface 29 may provide a curated experience for the searches performed by a user. For example, search interface 29 may provide a summary of all content marked with a star, or all content highlighted with a specific color (e.g., yellow). Moreover, search interface 29 may allow a user to add and/or remove annotations to include in the search request.

Figure 4:
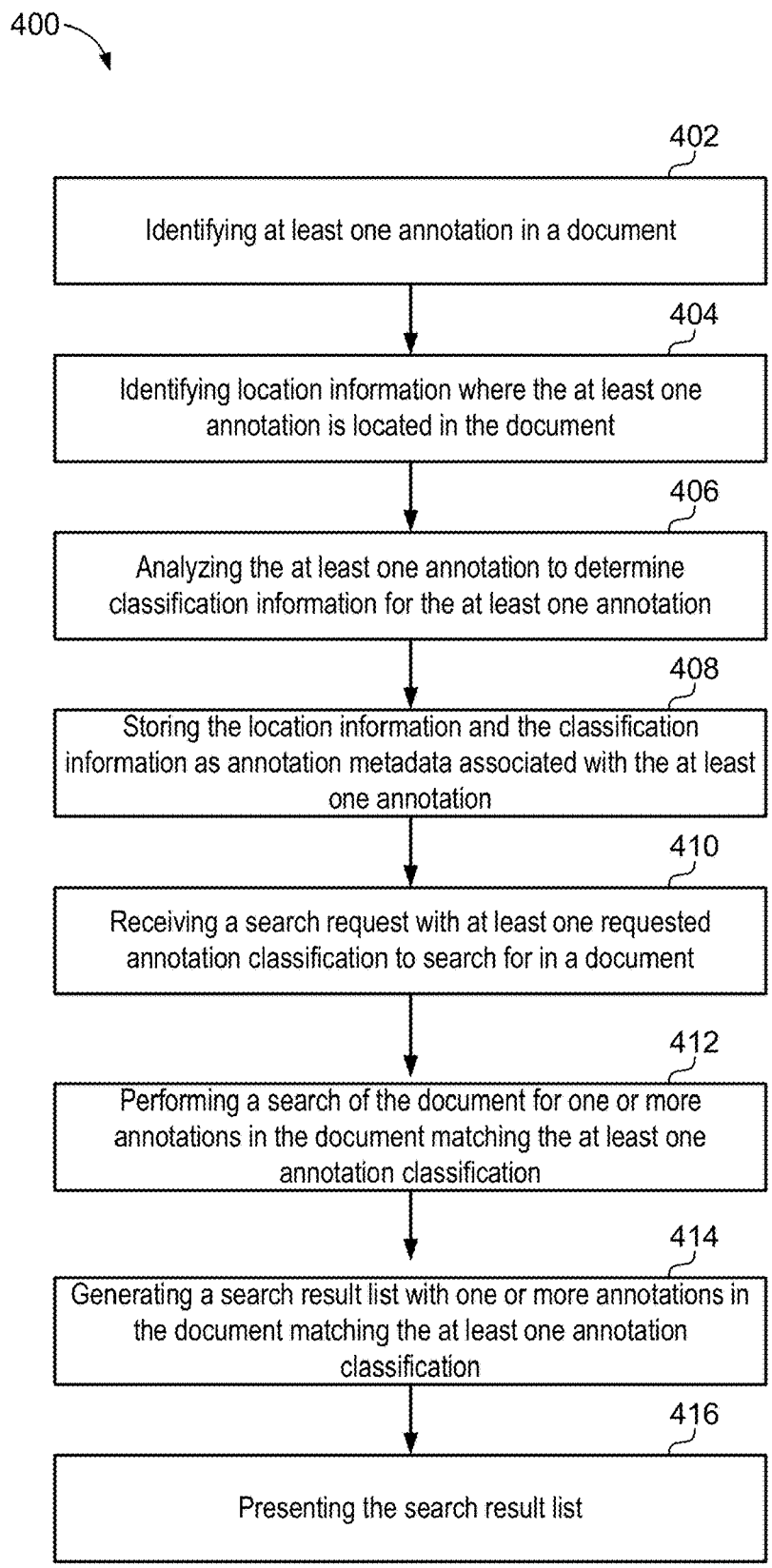
FIG. 4 is an example method flow for searching annotations in a document in accordance with an implementation of the present disclosure.

Referring now to FIG. 4, an example method flow 400 for searching annotations 16 (FIG. 1) in a document 12 (FIG. 1) for use with hardware of a computer device 102 (FIG. 1) is discussed in connection with the description of the architecture of FIG. 1. For example, computer device 102 may be used by a user to search the one or more annotations 16 added to document 12 based on the type or classification of the annotation.

At 402, method 400 may include identifying at least one annotation in a document. For example, annotation manager 14 may identify one or more annotations 16 in a document 12. Annotations 16 may include, but are not limited to, highlighting, ink strokes, underlines, notes, coloring, and/or markings made by the user on the document 12. Annotation manager 14 may identify when additional ink strokes, underlines, marks, highlighting, and/or notes are added to a document 12.

At 404, method 400 may also include identifying location information where the at least one annotation is located in the document. When an annotation 16 is detected in a document 12 by annotation manager 14, annotation manager 14 may determine location information 18 for the detected annotation 16. For example, when a user marks an electronic book displayed on a webpage with a question mark, annotation manager 14 may identify the HTML section of the electronic book where the question mark occurred. Another example may include a user highlighting a presentation. Annotation manager 14 may determine the line and/or page number where the user highlighted the presentation and store the line and/or page number as location information 18 of the highlighting.

At 406, method 400 may include analyzing the at least one annotation to determine classification information for the at least one annotation. Annotation manager 14 may analyze the detected annotation 16 and may determine classification information 20 that provides a classification to be associated with the annotation 16. Classification information 20 may include, but is not limited to, one or more of a shape of annotation 16, a color of annotation 16, a type of annotation 16 (e.g., highlighting, a symbol, text, etc.), and/or words added by annotation 16. In an implementation, annotation manager 14 may communicate with an ink analyzer 24 to determine the classification of annotation 16. The ink analyzer 24 may analyze the ink strokes of the detected annotations 16 in order to determine the classification information 20 for the annotation 16. For example, ink analyzer 24 may determine a shape of an ink stroke. In addition, ink analyzer 24 may determine the color of the ink stroke and/or mark. Ink analyzer 24 may also determine words added by the ink stroke and/or notes. For example, if a user added the words "read later" as notes to document 12, ink analyzer 24 may add the words "read later" as the classification information 20 for the notes. Annotation manager 14 may receive the classification information 20 from ink analyzer 24 for each detected annotation 16.

At 408, method 400 may include storing the location information and the classification information as annotation metadata associated with the at least one annotation. Annotation manager 14 may store annotation metadata 15 for the one or more annotations 16. Annotation metadata 15 may include, for example, location information 18 and/or classification information 20 associated with annotations 16. In addition, annotation metadata 15 may include associated content 21 that identifies content from document 12 associated with the one or more annotations 16. A portion of the content above and/or below the annotation 16 may be included in the associated content 21. Associated content 21 may include, but is not limited to, a portion of text (e.g., a line, a paragraph), images, and/or audio.

Annotation manager 14 may also create an annotation information table 22 with the annotation metadata 15 associated with document 12. For example, annotation information table 22 may store the classification information 20 along with the location information 18 of the annotations 16 identified in document 12.

At 410, method 400 may include receiving a search request with at least one requested annotation classification to search for in a document. A search manager 26 may receive one or more search requests 30 to search for requested annotation classification(s) 17 in document 12. The search requests 30 may identify one or more requested annotation classification(s) 17 to search for in document 12. The search requests 30 may also include other search criteria, such as, but not limited to, classification information 20 and/or location information 18. For example, a user may identify a particular type of annotation, e.g., highlighting annotations, for the requested annotation classification(s) 17 in the search request 30. In addition, a user may identify one or more location ranges to search in the document, e.g., search pages 1 through 10 of a book, for the requested annotation classification(s) 17. As such, the search performed by search manager 26 may be tailored based on the search criteria included in the search requests 30.

In an implementation, application 10 may provide a search interface 29 where one or more search requests 30 may be entered. Search interface 29 may allow a user to add and/or remove one or more requested annotation classification(s) 17 to include in search requests 30. For example, a user may access search interface 29 by, for example, selecting a search button in application 10. Search interface 29 may include a text box where a user may enter one or more requested annotation classification(s) 17 to search for in document 12. In addition, search interface 29 may include one or more icons of annotations 16 that the user may select to search for in document 12. The icons may include, but are not limited to, various shapes, characters, symbols, and/or colors. Search interface 29 may also include a drop down menu with one or more requested annotation classification(s) 17 that a user may select to search for in document 12. For example, the dropdown menu may include colors a user may select as the requested annotation classification(s) 17.

At 412, method 400 may include performing a search of the document for one or more annotations in the document matching the at least one annotation classification. Search manager 26 may perform a search based at least upon the search request 30. In an implementation, search manager 26 may search from the start of document 12 to the end of document 12 for annotations 16 matching the requested annotation classification 17. For example, search manager 26 may search the annotation metadata 15 and/or annotation information table 22 associated with document 12. Search manager 26 may search the annotation metadata 15 associated with document 12 for the requested annotation classification(s) 17. In addition, search manager 26 may search the annotation information table 22 associated with the document 12 for the requested annotation classification(s) 17. In an implementation, search manager 26 may perform the search at a document level and/or at a folder level.

At 414, method 400 may include generating a search result list with one or more annotations in the document matching the at least one annotation classification. When a match occurs between the requested annotation classification 17 and an annotation 16 and/or annotation metadata 15 associated with annotation 16, search manager 26 may store the annotation 16 in a search result list 34. A match may include, for example, when the requested annotation classification 17 matches the classification information 20 of an annotation 16. For example, if the user selected yellow highlights from a drop down menu as the requested annotation classification 17, a match may occur when the classification information 20 indicates yellow highlight for the annotation 16. As such, the search result list 34 may include all annotations 16 in document 12 matching the requested annotation classification 17 and/or any other search criteria included in the search request 30.

At 416, method 400 may include presenting the search result list. For example, display 32 may present the search result list 34. The search result list 34 may include associated content 21 from document 12 associated with the annotations 16. A portion of the content above and/or below the annotations 16 may be included in the search result list so a user may see the content surrounding the annotations 16. For example, the associated content 21 may include, but is not limited to, a line of text, a sentence of text, a portion of text, an image, and/or audio near the annotations 16. In an implementation, a predetermined range may be set to determine an amount of content to include in the search result list 34.

The search result list 34 may also include the associated annotation metadata 15 for the annotations 16 included in the search result list 34. The associated annotation metadata 15 may be used to navigate to portions of document 12 where the user added annotations 16. For example, a user may select an annotation 16 in the search result list 34 and the location information 18 may be used to move to the location in document 12 where annotation 16 was added to document 12. As such, the search result list 34 may be used to easily locate and/or navigate to portions of document 12 where the user added annotations 16.

In addition, the search result list 34 may also provide a curated experience for the search requests 30 performed by a user. The search result list 34 may provide a summary of the annotations 16 added to document 12. For example, the search result list 34 may provide a summary of all content marked with a star, or all content highlighted with a specific color (e.g., yellow).

Figure 5:
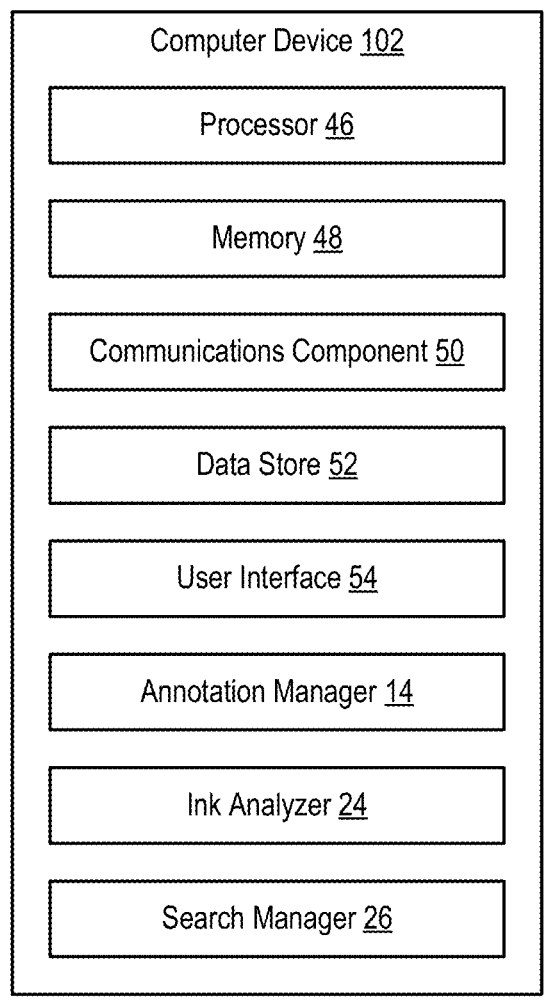
FIG. 5 is a schematic block diagram of an example device in accordance with an implementation of the present disclosure.

Referring now to FIG. 5, illustrated is an example computer device 102 in accordance with an implementation, including additional component details as compared to FIG. 1. In one example, computer device 102 may include processor 46 for carrying out processing functions associated with one or more of components and functions described herein. Processor 46 can include a single or multiple set of processors or multi-core processors. Moreover, processor 46 can be implemented as an integrated processing system and/or a distributed processing system.

Computer device 102 may further include memory 48, such as for storing local versions of applications being executed by processor 46. Memory 48 can include a type of memory usable by a computer, such as random access memory (RAM), read only memory (ROM), tapes, magnetic discs, optical discs, volatile memory, non-volatile memory, and any combination thereof. Additionally, processor 46 and memory 48 may include and execute operating system 110 (FIG. 1).

Further, computer device 102 may include a communications component 50 that provides for establishing and maintaining communications with one or more parties utilizing hardware, software, and services as described herein. Communications component 50 may carry communications between components on computer device 102, as well as between computer device 102 and external devices, such as devices located across a communications network and/or devices serially or locally connected to computer device 102. For example, communications component 50 may include one or more buses, and may further include transmit chain components and receive chain components associated with a transmitter and receiver, respectively, operable for interfacing with external devices.

Additionally, computer device 102 may include a data store 52, which can be any suitable combination of hardware and/or software, that provides for mass storage of information, databases, and programs employed in connection with implementations described herein. For example, data store 52 may be a data repository for applications 10 (FIG. 1), annotation manager 14 (FIG. 1), ink analyzer 24 (FIG. 1), and/or search manager 26 (FIG. 1).

Computer device 102 may also include a user interface component 54 operable to receive inputs from a user of computer device 102 and further operable to generate outputs for presentation to the user. User interface component 54 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 54 may include one or more output devices, including but not limited to a display, a speaker, a haptic feedback mechanism, a printer, any other mechanism capable of presenting an output to a user, or any combination thereof.

In an implementation, user interface component 54 may transmit and/or receive messages corresponding to the operation of applications 10, annotation manager 14, ink analyzer 24, and/or search manager 26. In addition, processor 46 executes applications 10, annotation manager 14, ink analyzer 24, and/or search manager 26, and memory 48 or data store 52 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   memory configured to store data and instructions;
   at least one processor configured to communicate with the memory;
   an operating system configured to communicate with the memory and the at least one processor, wherein the operating system is operable to:
   receive a search request to search a document for one or more user-input annotations that appear as additional markings on the document during a display of the document, wherein the search request includes at least one annotation classification corresponding to the one or more user-input annotations to search for in the document, wherein the at least one annotation classification is one of a plurality of annotation classifications that respectively identify a plurality of user-input annotations;
   perform a search of the document for the one or more user-input annotations in the document matching the at least one annotation classification;
   generate a search result list identifying the one or more user-input annotations in the document matching the at least one annotation classification; and
   present the search result list.

2. The computer device of claim 1, wherein the search result list includes location information where the one or more user-input annotations are located in the document.

3. The computer device of claim 2, wherein the search result list includes content from the document where the one or more user-input annotations are located in the document.

4. The computer device of claim 1, wherein the one or more user-input annotations have annotation metadata matching classification information associated with the at least one annotation classification.

5. The computer device of claim 4, wherein the annotation metadata includes the classification information of the one or more user-input annotations.

6. The computer device of claim 1, wherein the at least one annotation classification includes one or more of highlighting, ink strokes, notes, coloring, and markings, wherein each of the one or more user-input annotations is made responsive to a user input by adding a highlight, an ink stroke, a note, a color, a mark, or a symbol on a display of the document as the document is displayed to a user.

7. The computer device of claim 1, wherein the operating system is further operable to search from a start of the document to an end of the document for the one or more user-input annotations matching the at least one annotation classification.

8. The computer device of claim 1, wherein the operating system is further operable to search annotation metadata for the one or more user-input annotations in the document matching the at least one annotation classification.

9. A method for searching annotations in a document for use with hardware of a computer device, comprising:
   receiving, at an operating system executing on the computer device, a search request to search the document for one or more user-input annotations that appear as additional markings on the document during a display of the document, wherein the search request includes at least one annotation classification corresponding to the one or more user-input annotations to search for in the document, wherein the at least one annotation classification is one of a plurality of annotation classifications that respectively identify a plurality of user-input annotations;
   performing a search of the document for the one or more user-input annotations in the document matching the at least one annotation classification;
   generating a search result list identifying the one or more user-input annotations in the document matching the at least one annotation classification; and
   presenting the search result list.

10. The method of claim 9, wherein the search result list includes location information where the one or more user-input annotations are located in the document.

11. The method of claim 10, wherein the search result list includes content from the document where the one or more user-input annotations are located in the document.

12. The method of claim 9, wherein the one or more user-input annotations have annotation metadata matching classification information associated with the at least one annotation classification.

13. The method of claim 12, wherein the annotation metadata includes the classification information of the one or more user-input annotations.

14. The method of claim 9, wherein the at least one annotation classification includes one or more of highlighting, ink strokes, notes, coloring, and markings, wherein each of the one or more user-input annotations is made responsive to a user input by adding a highlight, an ink stroke, a note, a color, a mark, or a symbol on a display of the document as the document is displayed to a user.

15. The method of claim 9, wherein the search searches from a start of the document to an end of the document for the one or more user-input annotations matching the at least one annotation classification.

16. The method of claim 9, wherein the search searches annotation metadata for the one or more user-input annotations in the document matching the at least one annotation classification.

17. A non-transitory computer-readable medium storing instructions executable by a computer device, comprising:
   at least one instruction for causing the computer device to receive a search request to search a document for one or more user-input annotations that appear as additional markings on the document during a display of the document, wherein the search request includes at least one annotation classification corresponding to the one or more user-input annotations to search for in the document, wherein the at least one annotation classification is one of a plurality of annotation classifications that respectively identify a plurality of user-input annotations;
   at least one instruction for causing the computer device to perform a search of the document for the one or more user-input annotations in the document matching the at least one annotation classification;

at least one instruction for causing the computer device to generate a search result list identifying the one or more user-input annotations in the document matching the at least one annotation classification; and at least one instruction for causing the computer device to present the search result list.

\* \* \* \* \*